United States Patent
Elovici et al.

(10) Patent No.: US 9,934,337 B2
(45) Date of Patent: Apr. 3, 2018

(54) FLEXIBLE AND SCALABLE SIMULATIONS OF MASS PARTICIPANTS IN REAL TIME

(71) Applicant: DEUTSCHE TELEKOM AG, Bonn (DE)

(72) Inventors: Yuval Elovici, Arugot (IL); Dudu Mimran, Tel Aviv (IL); Barak Chizi, Ashkelon (IL); Moshe Bixenshpaner, Ra'anana (IL); Tomer Zrihen, Netivot (IL)

(73) Assignee: DEUTSCHE TELEKOM AG, Bonn (DE)

( * ) Notice: Subject to any disclaimer, the term of this patent is extended or adjusted under 35 U.S.C. 154(b) by 674 days.

(21) Appl. No.: 14/330,111

(22) Filed: Jul. 14, 2014

(65) Prior Publication Data
US 2015/0025867 A1    Jan. 22, 2015

(30) Foreign Application Priority Data
Jul. 18, 2013  (IL) ......................................... 227555

(51) Int. Cl.
G06F 17/50  (2006.01)
G06N 3/00   (2006.01)

(52) U.S. Cl.
CPC ......... *G06F 17/5009* (2013.01); *G06N 3/006* (2013.01); *G06F 2217/16* (2013.01)

(58) Field of Classification Search
None
See application file for complete search history.

(56) References Cited

U.S. PATENT DOCUMENTS

2016/0063144 A1* 3/2016 Cooke .................. G06Q 10/04 703/2

OTHER PUBLICATIONS

Ulicny et al: "Towards interactive real time crowd behaviour simulation" computer graphics forum vol. 21 No. 4 Feb. 28, 2003 p. 767-775.
Hlavacs et al: "Evaluating user satisfaction by simulation" technical report Wien Univ. Dec. 31, 2002 http:www.tk.jku.at/download/papers/gk tr02101.pdf (on Apr. 6, 2015).
Ligtenberg A et al: "A design and application of a multi agent system for simulation of multiactor spatial planning" Jemap London GB vol. 72 No. 1-2 Jun. 9, 2004 p. 43-55.
Miyashita:asap:agent base simulator for amusement park . . . scheduling Dec. 31, 2005.
European search report from a counterpart foreign application, 9 pages, dated Apr. 15, 2015.

* cited by examiner

*Primary Examiner* — Syed Roni
(74) *Attorney, Agent, or Firm* — Roach Brown McCarthy & Gruber, P.C.; Kevin D. McCarthy

(57) ABSTRACT

The invention is a highly efficient simulator that is not necessarily dependent on the number of participants—it can scale out to a mass number of participants and still run on a single very low-end computer. The simulator populates itself with individuals and, in accordance with a model of the system that comprises rules that govern the behavior of the individual participants, generates and records signals related to the activities that each participant carries out in real time to create a simulation of how the actual system performs. The recorded signals are stored in a data base, which can be mined for decision making.

11 Claims, 1 Drawing Sheet

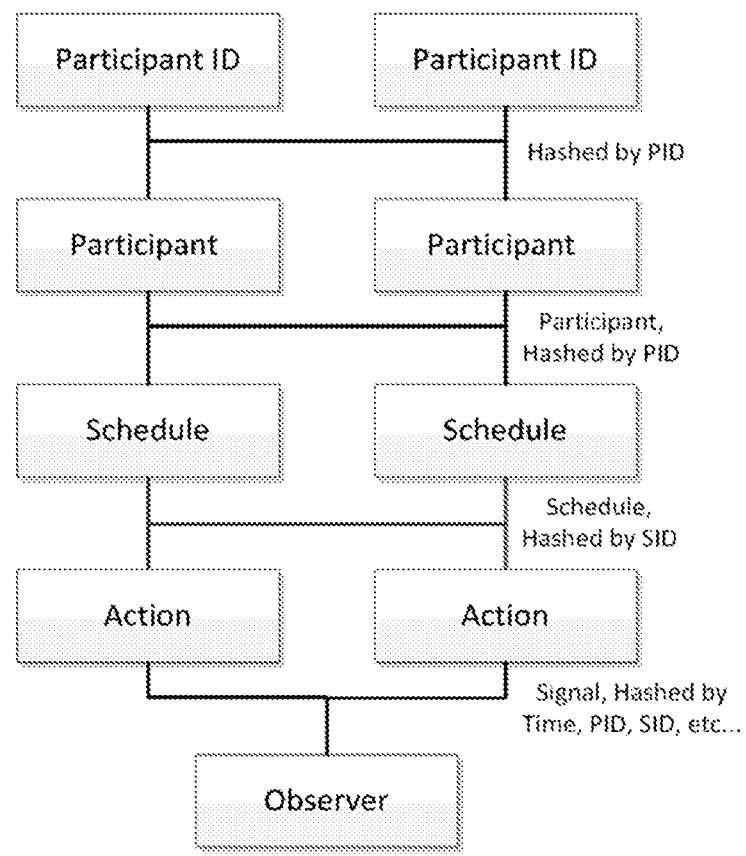

FLEXIBLE AND SCALABLE SIMULATIONS OF MASS PARTICIPANTS IN REAL TIME

FIELD OF THE INVENTION

The invention is from the field of computer simulations. Specifically the invention is a method for simulating the behavior of large numbers of participants in a system.

BACKGROUND OF THE INVENTION

Computer simulations are used in a wide variety of applications in the fields of science, medicine, social science, and many others in order to understand and predict the behavior of systems. The systems that are modeled and simulated are usually very large involving the individual activities of millions, billions, or more individual participants. To simulate such systems requires enormous computing resources. Therefore, two sometimes conflicting goals in designing a computer simulator are to achieve maximum similarity between the real system and the simulation of the system while minimizing the computing resources in time of space and time needed to carry out the simulation. Another problem is that in most cases a computer simulator designed to work with a model of a system will not work with other systems or even with different models of the same system.

It is therefore a purpose of the present invention to provide a computer simulator that is flexible and scalable, allowing it to be used with different systems with different numbers of participants.

Further purposes and advantages of this invention will appear as the description proceeds.

SUMMARY OF THE INVENTION

The invention is a simulator which simulates in real time the behavior of mass participants in a system. The simulator has an architecture adapted to allow maximum flexibility and adaptation to the time and auxiliary constraints of a wide variety of computer models of real systems. The architecture of the simulator is comprised of five levels, each of which is comprised of a plurality of identical components that carries out a specific task and Dynamic Adapter components. The levels being:

i. Level 5 comprises Participant ID Generator components whose function is to randomize integers between 1 and P, where P is the total number of participants in the system being simulated. The Participant ID Generator components only randomly select the ID numbers of participants that are actually performing some activity at any given moment. The output of the Participant ID Generator components is known as the Participant ID (PID), which is passed to level 4.

ii. Level 4 comprises Participant Generator components adapted to use the PID that they receive as a random seed to generate profiles of the participants. The profiles known as Participants are passed to level 3;

iii. Level 3 is comprised of Schedule Generator components adapted to create schedules for given participants and to pick the current decision at a given time. The decisions, identified by their Schedule ID (SID), are passed to level 2.

iv. Level 2 is comprised of Action Transformer components adapted to receive the current decisions in terms of the simulated world and to transform them to Signals received by the simulated system. The signals are passed to level 1.

v. Level 1 is comprised of at least one Signal Observer component adapted to receive the Signals from the Action Transformer components and to stream them as the output signals observed by the simulated system. The number of instances reflects the number of concurrent output streams.

The Dynamic Adapter components are adapted to deal with caching decisions simulation-wide and to convert between time space and auxiliary space of the various components according to the current state of the machine the simulation is running upon.

The simulator of the invention can be adapted to simulate a system of any size by increasing or decreasing the number of components in each level of the architecture.

In embodiments of the simulator of the invention the Participant Generator component to which a specific PID is passed from a Participant ID Generator component is selected according to a hash of the PID and will be the same each time that PID is selected by one of the Participant ID Generator components.

In embodiments of the simulator of the invention the same PID always goes to the same Participant Generator component in level 4, thereby allowing the profiles generated for each participant to be cached locally and form a distributed cache.

In embodiments of the simulator of the invention the Schedule Generator component to which a specific Participant is sent from a Participant Generator component is selected according to a hash of the PID and will be the same each time that PID is selected.

In embodiments of the simulator of the invention the same Participant always goes to the same Schedule Generator component, thereby allowing the schedules to be cached locally and form a distributed cache.

In embodiments of the simulator of the invention a Consistency Period is defined for the simulation, so that all activities of all participants are logically consistent in such intervals. Given the current time and the defined Consistency Period, two values are produced: Current Time Within Consistency Period and Consistency Time.

In embodiments of the simulator of the invention the Schedule Generator components use a combination of the PID along with the Consistency Time as a random seed for schedule creation for the given participant at the given Consistency Time.

In embodiments of the simulator of the invention if caching is not feasible in level 3, then the schedule is generated from the Consistency Time and up to the Current Time within the Consistency Period. If caching is necessary, the schedule is generated for the entire Consistency Period each time. Incomplete decisions are cached, so that the schedule generation process of the next phase insists on finishing them before proceeding with further colliding decisions, thereby allowing the entire simulation to be logically consistent at all times.

In embodiments of the simulator of the invention the Action Transformer component to which the activities of a specific Participant are sent from a Schedule Generator component is determined according to a hash of the Schedule ID (SID).

In embodiments of the simulator of the invention in which there is more than one Signal Observer component, the Signal Observer component to which the Signal is sent from an Action Transformer component is selected according to a hash of the output time period, PID, SID, or some combination of them.

All the above and other characteristics and advantages of the invention will be further understood through the following illustrative and non-limitative description of embodiments thereof, with reference to the appended drawings.

BRIEF DESCRIPTION OF THE DRAWINGS

FIG. 1 schematically shows the components of which the simulator of the invention is comprised as well as the data flow.

DETAILED DESCRIPTION OF EMBODIMENTS OF THE INVENTION

The invention is a highly efficient simulator that is not necessarily dependent on the number of participants—it can scale out to a mass number of participants and still run on a single very low-end computer. The simulator populates itself with individuals and, in accordance with a model of the system that comprises rules that govern the behavior of the individual participants, generates and records signals related to the activities that each participant carries out in real time to create a simulation of how the actual system performs. The recorded signals are stored in a data base, which can be mined for decision making. As an example the system can be used to simulate the use each client of a cellular network makes of his device at all times of the day and also the locations at which each specific activity is carried out. Other systems to which the simulator of the invention can be applied are, for example, to simulate the flow of Internet Protocol packets in a computer network, the spread of disease in order to predict epidemics and their path or to track the dissemination of "secret information" throughout a social network.

FIG. 1 schematically shows the architecture of the simulator of the invention. This architecture allows maximum flexibility and adaptation to the time and auxiliary constraints of a wide variety of computer models of real systems.

The architecture of the system is comprised of five levels and the data flow is from the uppermost level in the FIGURE downwards towards the lowest level. Each level comprises a plurality of identical components (only two are shown in the FIGURE for simplicity) that carries out a specific task. The function of each of the components and the interactions between them will now be described. The simulator of the invention can be adapted to simulate a system of any size simply by increasing or decreasing the number of components in each level of the architecture.

Participant ID Generator

The function of the Participant ID Generator components is to randomize integers between 1 and P, where P is the total number of participants in the system being simulated. As opposed to prior art simulators that do maintenance on all participants all of the time, the Participant ID Generator components only randomly select the ID numbers of participants that are actually performing some activity at any given moment. Thus the number of integers that are randomized by the Participant ID Generator components reflects the number of concurrent signals in the simulator, and the rate each component emits those integers indicates the output data rate of the simulator.

The output of the Participant ID Generator is known as the PID, which is passed to the next lower level. The Participant Generator component to which a specific PID is passed is selected according to a hash of the PID and will be the same each time that PID is selected by one of the Participant ID Generator components.

Participant Generator

The Participant Generator components use the PID that it receives from the Participant ID Generator as a random seed for participant creation. That is the Participant Generator component generates a profile of the participant that, depending on the system being simulated can contain information such as age, sex, marital status, home and work addresses, occupation, hobbies, etc.

Since the same PID always goes to the same Participant Generator component in this level, the profiles generated for each participant can be cached locally and form a distributed cache.

The generated participant profile, called herein Participant, is then passed to the next lower level. The Schedule Generator component to which a specific Participant is sent is selected according to a hash of the PID and will be the same each time that PID is selected.

Schedule Generator

A Consistency Period is defined for the simulation, so that all activities of all participants are logically consistent in such intervals. This means for example in a simulation of a cellular network, the current location of a participant cannot be generated by the Schedule Generator to be 100 km away from the position that was generated five seconds earlier. The length of the Consistency Period is fixed and can be for example 24 hours, or any other period of time that is consistent with the objectives of the simulation and the system being simulated.

Given the current time and the defined Consistency Period, two values are produced:

Current Time Within Consistency Period—The current time modulus the consistency period.

Consistency Time—The current time minus the Current Time within the Consistency Period.

The Schedule Generator uses a combination of the PID along with the Consistency Time as a random seed for schedule creation for the given participant at the given Consistency Time.

Since the same Participant always goes to the same Schedule Generator component, the schedules can be cached locally and form a distributed cache. If caching is not feasible, then the schedule is generated from the Consistency Time and up to the Current Time within the Consistency Period. In case caching is necessary, the schedule is generated for the entire Consistency Period each time.

Incomplete decisions are cached, so that the schedule generation process of the next phase insists on finishing them before proceeding with further colliding decisions. This allows the entire simulation to be logically consistent at all times.

Once the schedule has been generated, the current decision, i.e. activity, is picked according to the current time within the consistency period and passed to the next lower level. The Action Transformer component to which the activities of a specific Participant are sent is determined according to a hash of the Schedule ID (SID).

Action Transformer

The Action Transformer component receives the current decision in terms of the simulated world, and is responsible of transforming it to a Signal received by the simulated system, e.g., in a cellular network the Action Transformer based on the Participants schedule generates a signal representative of the action taken by the Participant at a given time, e.g. calls home, and the location, i.e. antenna, at which the call was made.

The Signal is then passed to the lowest level in the architecture. In case there is more than one Signal Observer component, the target component is selected according to a hash of the output time period, PID, SID, or some combination of them.

Signal Observer

The Signal Observer components receive simulated signals from the Action Transformer components and stream them as the output signals observed by the simulated system. The number of instances reflects the number of concurrent output streams (e.g., files). Output streams can be grouped by time intervals (e.g., minutes), by schedules, by participants, by any other property or by any combination of them.

Dynamic Adapter

The Dynamic Adapter components are not shown in FIG. 1. They deal with caching decisions simulation-wide and convert between time space and auxiliary space of the various components according to the current state of the machine the simulation is running upon e.g. the amount of memory space available, at the instance that the decision is made. For example, when a new PID is received by a Participant Generator component from the Participant ID Generator a Dynamic Adapter component decides whether to cache the profile of the Participant so that they will be quickly available the next time the same PID is received or not to cache and to generate the profile again the next time the PID is received.

The Dynamic Adapter components make the simulator of the invention very efficient by converting between time apace, i.e. the amount of time it takes the components of the machine on which the simulation is running to perform an activity, e.g. to generate the profile of a Participant, and auxiliary space, i.e. the amount of physical space in the memory of the machine.

The following core concepts govern the behavior of the simulator:

- A participant is an individual that has just performed an action and the task of the simulator is to make a decision, i.e. to determine what the action the participant performed.
- Given the same random seed, a random function will produce the same random queue; and, given the same random queue, a deterministic method for decision making is used that will produce the exact same decision set.
- The information passed from one component of the simulator to another is sent to the target instance according to a hash code of the target identity field. This allows the data on the target component to be easily aggregated in a distributed cache.
- The random queue and distributed caching serve as a transformation between time space and auxiliary space. Another hash upon the data within a certain component of the simulator allows partial caching within that component.
- Decisions of participants are consisted, i.e. logically consistent, across the consistency period defined for the simulation. In order for the simulation to be consisted at all times, unfinished decisions are cached and the scheduler insists on finishing them before proceeding with further decisions.

The simulator of the invention has many advantages over prior art simulators:

The simulator of the invention is flexible. It can be adapted to be used to simulate a wide variety of systems.

The simulator of the invention can be adapted to simulate a system of any size simply by increasing or decreasing the number of components in each level of the architecture.

The simulator of the invention only maintains participants that are actually performing some activity at any given moment as opposed to prior art simulators that do maintenance on all participants all of the time.

The simulator of the invention very efficiently converts between time apace and auxiliary space at each stage in the simulation, thereby allowing real time simulations by balancing between the time it takes to perform the simulation and the computing resources that are available at any given moment.

Although embodiments of the invention have been described by way of illustration, it will be understood that the invention may be carried out with many variations, modifications, and adaptations, without exceeding the scope of the claims.

The invention claimed is:

1. A simulator comprising a memory which comprises instructions and at least one hardware processor to execute said instructions, for simulating in real time the behavior of mass participants in a real system by creating a simulation of how said real system performs by populating itself with individuals and generating and recording signals related to the activities that each participant carries out at any given moment, without the need to maintain all participants of the system, said simulator having an architecture adapted to allow maximum flexibility and adaptation to the time and auxiliary constraints of a wide variety of computer models of real systems, said at least one hardware processor comprising:

i) Participant ID Generator components, which randomly select from a total number of participants ID numbers of participants that are actually performing some activity at any given moment; the output of the Participant ID Generator components is known as the Participant ID-(PID);

ii) Participant Generator components adapted to use the PID to generate profiles of participants that are actually performing some activity, said profiles are known as Participants;

iii) Schedule Generator components adapted to create schedules of activities for each Participant and to pick a decision regarding a current activity at a given time, where decisions are identified by their Schedule ID (SID);

iv) Action Transformer components adapted to receive the current activities for each Participant in terms of a simulated world and to transform them to Signals received by a simulated system;

v) at least one Signal Observer component adapted to receive said Signals from the Action Transformer components and to stream them as output signals observed by the simulated system, wherein a number of instances reflects a number of concurrent output streams; and vi) Dynamic Adapter components adapted to deal with caching decisions simulation-wide and to convert between time space and auxiliary space of various components of the simulator according to the current state of the at least one processor the simulation is running upon.

2. The simulator of claim 1, which is adapted to simulate a system of any size by increasing or decreasing the number of components in each level of the architecture.

3. The simulator of claim 1, wherein the Participant Generator component to which a specific PID is passed from a Participant ID Generator component is selected according to a hash of the PID and is the same each time that PID is selected by one of the Participant ID Generator components.

4. The simulator of claim 1, wherein the same PID always goes to the same Participant Generator component, thereby allowing the profiles generated for each participant to be cached locally and form a distributed cache.

5. The simulator of claim 1, wherein The Schedule Generator component to which a specific Participant is sent from a Participant Generator component is selected according to a hash of the PID and will be the same each time that PID is selected.

6. The simulator of claim 1, wherein the same Participant always goes to the same Schedule Generator component, thereby allowing the schedules to be cached locally and form a distributed cache.

7. The simulator of claim 1, wherein a Consistency Period is defined for the simulation, so that all activities of all participants are logically consistent in such intervals, wherein given a current time and the defined Consistency Period, two values are produced: Current Time Within Consistency Period and Consistency Time.

8. The simulator of claim 7, wherein the Schedule Generator components use a combination of the PID along with a Consistency Time as a random seed for schedule creation for the given participant at the Consistency Time.

9. The simulator of claim 7, wherein, when schedules of activities for each participant are created by the Schedule Generator components, if caching is not feasible, then the schedule is generated from a Consistency Time and up to a Current Time within a Consistency Period, if caching is necessary, the schedule is generated for the entire Consistency Period each time; and incomplete decisions are cached, so that a schedule generation process of a next phase insists on finishing them before proceeding with further colliding decisions, thereby allowing an entire simulation to be logically consistent at all times.

10. The simulator of claim 1, wherein the Action Transformer component to which activities of a specific Participant are sent from a Schedule Generator component is determined according to a hash of the Schedule ID (SID).

11. The simulator of claim 1, wherein in case there is more than one Signal Observer component, the Signal Observer component to which the Signal is sent from an Action Transformer component is selected according to a hash of an output time period, PID, SID, or some combination of them.

* * * * *